J. Clark, Jr.,
Turning Regular Forms.
N° 1,705.
Patented July 30, 1840.
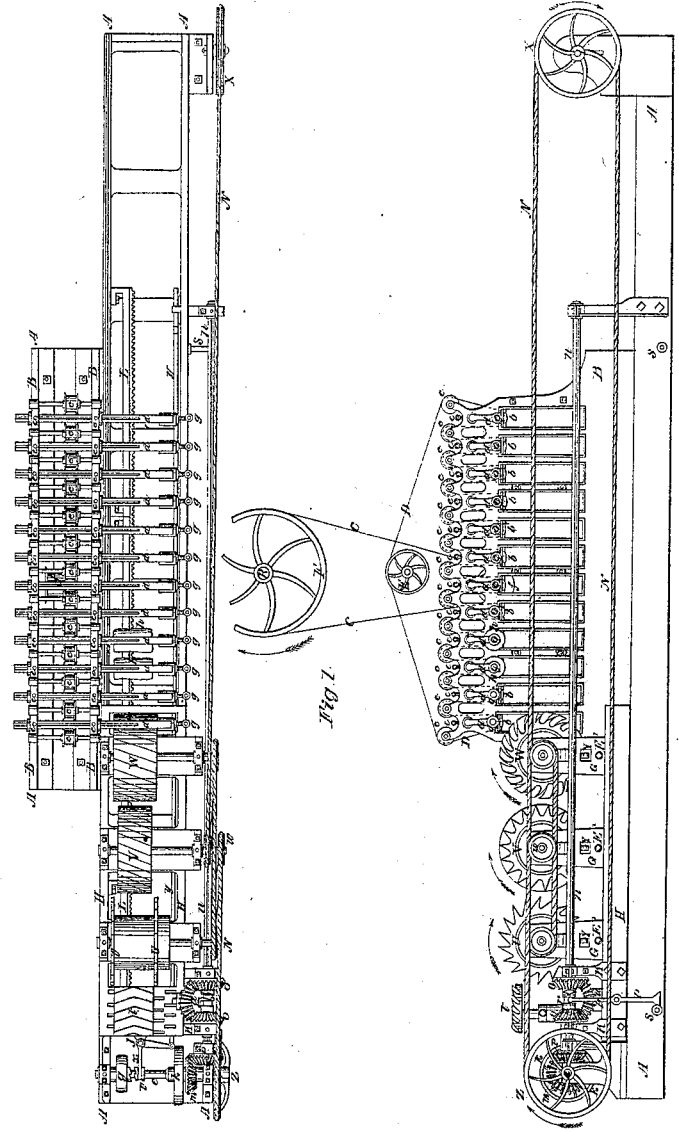

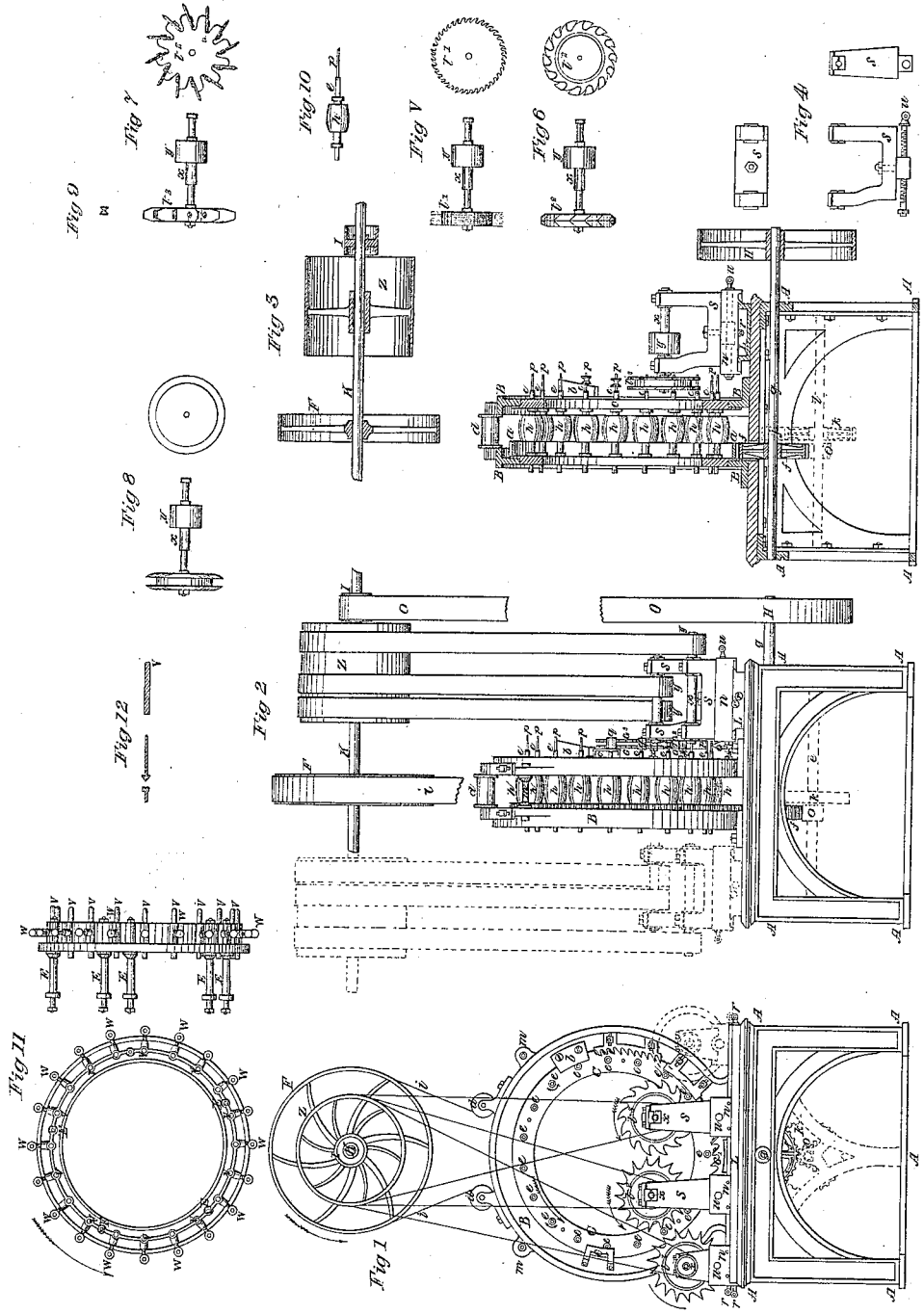

UNITED STATES PATENT OFFICE.

JOHN CLARK, JR., OF GLASGOW, SCOTLAND.

MACHINERY FOR TURNING.

Specification of Letters Patent No. 1,705, dated July 30, 1840.

*To all whom it may concern:*

Be it known that I, JOHN CLARK, Jr., of Mile End, Glasgow, Scotland, cotton-spinner, a subject of the Queen of Great Britain, have invented or discovered new and useful Improved Machinery for Turning, some part or parts of which may be made applicable to other useful purposes; and I, the said JOHN CLARK, Jr., do hereby declare that the nature of my said invention and the manner in which the same is to be performed are fully described and ascertained in and by the following statement thereof, reference being had to the drawings hereunto annexed, and to the figures and letters marked thereon and also to the models exhibited and produced by me—that is to say:

My improved machinery for turning may be constructed in two different ways, whereof one (which is represented in Plan I of the drawings hereunto annexed,) operates by a slow progressive motion in a circular orbit, and the other (represented in Plan II) operates by a slow progressive motion in a straight line, the operation of such slow progressive motion, being in either case to subject rough unshapen articles which are required to be turned, (that is to be reduced circularly by the operation of turning) to some particular form and size, which is truly circular. I say, to subject each one of such articles to the operation of the cutting edges of a series of suitable cutting tools, while the said article is turned continually and rapidly around its own axis of rotation, (that is, around the central line of its intended circular form,) the said slow progressive motion being in a direction crosswise to the direction of the said axis of rotation, in order that those said cutting edges may cut off from the revolving article, all such superfluities as may be requisite for reducing it circularly to the intended form and size, and for thereby attaining the same result, as might be attained by turning the article in a lathe. The said slow progressive motion, (whether in a circular orbit or in a straight line as aforesaid,) is so directed as to cause each revolving article and the cutting edges to approach gradually, one toward the other, until by their gradual contact the intended cutting or reducing is performed, and then after that the onward progress of the same slow progressive motion, (without any discontinuance or change of its direction,) causes the same revolving article and cutting edges, which have been recently brought into contact, to quit that contact, and gradually recede or separate, one from another, in order that by the farther onward progress of the said slow progressive motion, the same revolving article which has been subjected to the operation of the aforesaid cutting edges (and has been roughly reduced thereby to a circular form) and the cutting edges of other suitable cutting tools, may be caused to approach gradually one toward the other, to bring them in gradual contact, suitably for reducing the revolving article circularly to a nearer approximation to the intended form and size, and after such contact, the farther onward progress of the said slow progressive motion, causes a gradual separation as already explained, and so on, the revolving article is subjected to the operation of another and another tool until that intended form and size is attained. Wherefore by operation of the slow progressive motion, each article is subjected to the operation of as many cutting tools as may be requisite for reducing it circularly by succeeding stages of formation from its rough unshapen form to its intended form and size, some of those tools being adapted to cut and reduce some parts of the article, and others of the tools being adapted to cut and reduce other parts thereof to the form and size which is intended to be given to those parts respectively.

Note: The said slow progressive motion may either be given to the revolving article, or else the same may be given to the cutting tools in order in either case to cause the one to approach toward the other as aforesaid, until they come gradually in contact for performing the intended cutting, and after that to cause them to quit that contact and gradually to recede or separate one from the other as aforesaid. And the machinery may contain several duplicates of the articles which are to be turned in manner aforesaid, and each of those articles will by the aforesaid slow progressive motion be subjected in turn, one after another to the aforesaid action of the several cutting tools, so as to be by them reduced circularly by succeeding stages of formation, to the intended form and size. And the said cutting tools (or some of them) may be stationary or they may be only moved with the said slow progressive motion while in operation; that is, the said cutting tools may either be fixed immovably during the time of their intended cutting operation, or they may be carried along by the slow progressive motion without any other motion than that, so as in either case when by the aforesaid operation of the slow progressive motion the revolving articles and the cutting edges are brought into gradual contact, that those cutting edges shall be duly qualified for intercepting and cutting off such superfluities from the revolving articles as will reduce them circularly, as much as is intended to be done by those cutting edges, or else the said cutting tools (or some of them) may be revolving cutters whereof the cutting edges move around in circles in order that those cutting edges may be kept in rapid motion when by the aforesaid operation of the slow progressive motion the revolving articles and the said revolving cutting edges are brought into gradual contact; and that rapid motion of the cutting edges will expedite the cutting away of such superfluities as will reduce the revolving articles circularly as much as is intended to be done by those moving cutting edges.

In all cases each of the cutting tools whether revolving or otherwise, must be susceptible of adjustment as to the position wherewith its cutting edge or edges, will by operation of the slow progressive motion be brought into contact with the revolving article, and those adjustments must be suitably made, for enabling the cutting edges to reduce the article (or some parts of the article) as much as is required to be done to the article, or to the several parts thereof, by each of the tools respectively, at each succeeding stage of the formation of the article.

Description of the improved machinery for turning which is represented in Plan I. It operates by carrying around in a circular orbit a number of the articles which are to be turned, and at the same time giving each of those articles a rapid motion around its own central line or axis of rotation, in order that by a slow progressive motion, in that orbit, the said articles may be subjected one after another while they are revolving rapidly around their own several axes of rotation to the cutting edges of a set of cutting tools, some whereof are rotatory, so that the cutting edges move with rapidity in circles; and others are stationary tools, some of the said tools of either class being adapted to cut and reduce some parts, and others of the said tools being adapted to reduce other parts of each article to the form and size which is intended to be given to such articles by the operation of turning them, in the improved machinery.

Figure I, is a front elevation. Fig. II, an end elevation, and Fig. III, is a vertical section of the machine.

The same letters of reference denote the same parts of the machine in all the figures.

A, A, A, A, is a frame work constituting a bench or table, upon which the machine is fixed. B, B, two circular plates or rings of cast iron, fixed one opposite to the other in parallel vertical planes, their interior circular apertures being in exact conformity the one with the other, they are fixed by screws to the framing A, A, and are firmly united the one to the other by the short stays $m, m$.

C, C, are two movable rings, whereof the external circumferences are fitted truly into the interior circular apertures of the two fixed rings B, B; so as to be capable of revolving freely therein, the two movable rings C, C, are connected together, by four or more stays which unite them firmly, and the rings C, C, have prominent border flanges around their exterior circumferences, which flanges by applying against the borders of the circular apertures in the fixed rings B, B, retain the two revolving rings C, C, securely within the fixed rings B, B, without impediment to the revolving motion of the former.

$a$, Figs. II and III, is a ring of teeth attached to one of the revolving rings C, so as to form a large spur wheel, the teeth whereof are engaged by the teeth of the small spur wheel $f$, and by action thereof the two movable rings C, C, are turned around within the two fixed rings B, B, with a slow progressive motion.

K, is a horizontal shaft disposed over the machine, and turned around by the first moving power, for the purpose of giving the requisite motion to all parts of the improved machinery. On the shaft K, a small pulley I is fixed and communicates a slower motion by means of the endless belt or strap O, to the large pulley H, which is fixed on the extremity of the same horizontal axis $g$, as the small spur wheel $f$, by which the movable rings C, C, are turned slowly around.

Note: The motion may be rendered still slower, when required to suit the machinery for turning articles of hard materials, by thus bringing into action a small pinion $j$, which is fitted upon the axis $g$, in order to turn a larger spur wheel $k$, on an axis $l$, situated beneath, and on the axis $b$, is another small pinion $o$, to work in the teeth of the small spur wheel $f$. The small pinion $o$, is fitted loose on its axis $l$, and therefore has no operation until it is required to give the very slow motion, then the pinion $o$, must be made fast to its axis $l$, and at the same time the wheel *f* must be set loose on its axis *g*, and also the endless belt on the pulleys I, and H, must be crossed.

The two movable circular rings C, C, are furnished with spindles which are marked *e, e, e,* very similar to the spindles of a turning lathe, they are supported in a horizontal direction, by having their ends fitted into suitable collars or holes in the two rings C, C; so that all the twenty spindles are arranged at equal distances around in one circle. The two ends of each spindle project out beyond the two rings C, C, and one or both of those projecting ends may have screws formed upon them, or may have hollows perforated in them, the inside of which hollows may be screws, or the spindles may be hollow throughout in any of the modes used in turning lathes, for fixing the articles which are to be turned to the end of the spindles. Each of the spindles has a pulley *h*, fixed upon it, and those pulleys are encompassed by a broad belt *i* from the large pulley F, fixed on the upper shaft K.

Note: The belt *i* is broken off in Fig. II, to show the pulleys *h, h*. The belt *i* passes within two rollers *d, d*, which are supported by the two fixed rings B, B, so as to gather the belt in around the greater number of the pulleys *h*. The belt *i* by its action on the several pulleys *h, h*, turns each of the spindles around with a rapid motion about its own central line, at the same time that by the motion of the rings C, C, within the fixed rings B, B, all the spindles are carried around with a slow progressive motion in the circular orbit which they occupy. The articles to be turned, being fixed at the ends of the several spindles as seen at *q, q,* in Fig. II, in their rough unshapen state, these articles partake of the aforesaid compound motion of the spindles, that is, each article is caused to revolve rapidly around its own central line, or axis of rotation, and at the same time they are all carried slowly around in the circular orbit wherein all those axes are arranged.

L is a horizontal bar or pathway, fixed on the top of the table A, A. It has prominent edges upon which the saddles *n, n, n,* are fitted in the manner of dovetailed sliders, and they can be moved along the pathway L, by means of the long screws *r, r, r*.

S, S, S, are carriages for receiving and sustaining horizontal spindles *x, x, x,* in suitable bearings, the lower parts of the carriages S, S, S, are based upon and attached to horizontal sliders which are fitted to the saddles *n, n, n,* so as to be capable of being moved in a direction at right angles to the pathway L, by the screws *u, u, u*. These screws *u, u, u*, together with the screws *r r, r*, are for the purpose of adjusting the position of the several spindles *x, x, x,* and consequently the rotatory cutting tools *t, t, t,* which are fixed on the extremities of the spindles *x, x, x,* (see Figs. I, and III,) in order to suit them for cutting the articles which are to be turned.

Note: The carriages S, are attached to the horizontal sliders upon which they stand, by one screw for each carriage, which allows the same to be turned about so as to place the spindle *x*, at any angle with the direction of slider and screw *u*, or parallel thereto as may be required.

The revolving cutting tools are broken off at Fig. II, to show other parts. Each of the spindles *x*, has a pulley *y, y,* fixed upon it to give it a rapid rotatory motion by a band or belt from a large pulley or drum Z, fixed upon the shaft K.

The revolving cutting tools, some of which may be of the nature of circular saws variously combined, or may be of other kinds of circular cutters, according to the articles which are to be turned, are fixed upon the ends of the several spindles *x, x, x,* and are placed by means of the screws *r, r,* and *u, u,* in suitable positions to qualify their revolving cutting edges, to intercept and cut the articles which are to be turned, as the same are carried around in their circular orbit by the progressive motion of the rings C, C, each of those articles at the same time revolving rapidly around its own axis, by the motion given to their several spindles *e, e*. The revolving cutting tools may be disposed so as to act upon the said articles at the exterior of the circular orbit in which they circulate, or else at the interior thereof, in which latter case, the carriages S must be tall enough to sustain the revolving cutters in a sufficiently elevated position, but in the former case, the carriages are lower as is shown in the drawing.

The revolving tools, when combined of circular saws, may have several such saws of the ordinary kind, placed side by side, as shown in Fig. V, with circles of pasteboard or metal, or any other suitable substance interposed between them to hold them at small distances asunder, such revolving cutters are adapted for roughly turning or reducing articles, which are to be turned in soft wood, because the wood which is left uncut in the intervals between the saws, is easily broken away in fragments, and as much wood is removed as the whole breadth occupied by all the several saws, which are so combined.

If the circular saws which are so combined are all of one size, then all their several cutting edges will cut equally, to reduce the revolving article upon which they operate either to a cylindrical, or to a straight tapering form, according as the spindle *x*, is set parallel to the spindles *e,* or with a slight obliquity thereto; but if circular saws of several different sizes are combined together in manner aforesaid, then the teeth of those saws which are largest in diameter will cut deeper into the revolving article than the teeth of the saws which are smaller in diameter will cut; and thus by suitable adaptation of circular saws of different diameters they can be combined to form revolving tools whereby the articles may be roughly reduced to the required form.

Another kind of revolving tool for operating upon harder wood, or for smoother turning than the before mentioned combined saws, may be made very similar to a circular saw, but of much thicker metal, as represented in Fig. VI, the teeth being formed to sharp cutting edges, and those edges having a suitable bevel or obliquity to the direction of the spindle $x$, and two or more such circular tools may be combined side by side, either in close contact, or with small intervals between them.

Another kind of revolving cutter, may be formed of cutters very similar to carpenters' or joiners' gouges, chisels or plane irons, either single irons for rough cutting or what are called double irons for smooth cutting. A number of such cutters may be fastened by screws or otherwise, on to suitable notches formed in a circular wheel for their reception, and adapted to hold their cutting edges in the most advantageous position for enabling them to perform the intended cutting by the revolving motion of the wheel— an example is shown in Fig. VII.

Other revolving cutters may be a circular knife or knives, having a continuous sharp cutting edge all around the circumference, for cutting the ends off the articles which are to be turned (see Fig. VIII).

The stationary cutting tools are seen at G, G, G, Fig. I and II, and vary in form and construction according to the work they are required to perform. Some of those fixed tools consists of a series of teeth on sharp cutting edges, similar to those of a number of chisels which may be formed of one piece of metal or of several pieces, blades or gouges, or chisels or plane irons, double or single, combined and fastened together by screws or wedges or otherwise. The tools so formed being held by suitable supporting brackets fastened by clamping screws to the rings B, B, or to the table A, A, so as to be capable of all requisite adjustments, to their several positions, to qualify their cutting edges for intercepting the revolving articles which are to be turned, and reducing the same circularly to the intended form and size, some such tools operating upon some parts of the articles, and others of those tools operating upon other parts thereof as may be required. Also some of such tools must be adapted to operate delicately for smooth cutting or turning the same parts of the articles, which have been previously roughly cut and rendered circular by other tools, either revolving or stationary or of both those kinds in succession. Others of the fixed tools are knife edged, and are fixed in suitable positions, for cutting turning and forming the ends of the revolving articles which are to be turned.

By way of example of the operation of the said improved machinery, it may be supposed to be employed (for the time being) in turning wooden bobbins such as are used by spinners and other manufacturers, for instance such as is shown at Fig. IX. Each of the spindles $e, e$, is to have a suitable mandrel or small spindle $p$, fixed on its hollow (see Fig. X,) and projecting out therefrom in a suitable manner for receiving the unshaped piece of wood or block to be turned, the same as would be done in a common lathe for turning the same kind of bobbins. The rough pieces or blocks of wood being previously prepared and perforated with holes in the usual manner, are stuck on the projecting ends of the several mandrels $p$, and as they are carried with a slow progressive motion around in their circular orbit by the motion of the rings C, C, each piece of wood is at the same time turned rapidly around about its own axis, by the motion given to its spindle $e$. And in that course each piece of wood (in its turn) is brought within reach of the teeth of the circular cutter $t^1$ (see also Fig. V), which is revolving rapidly, and those teeth cut away the superfluous wood and reduce the same circularly to a cylindrical form, which although roughly cut is of a sufficient size to allow the outside diameter of the bobbin to be formed therefrom. After that operation of the cutter $t^1$, the same wood is in turn brought within reach of the teeth of the cutter $t_2$ (see also Figs. VI or VII,) and their cutting edges cut away and reduce the revolving wood circularly, at the middle part, to a sufficient size for roughly forming the small part of the bobbin; leaving the two ends of the size to which they were reduced by the preceding rotatory cutter $t^1$; and then the wood is in its turn brought into contact with the stationary tool or tools $G^1$ Figs. I and II, the cutting edges whereof are adjusted to smooth cut the same parts which have been previously roughly cut by the rotary cutter $t^2$; and then in turn the wood is brought into contact with the rotary cutter $t^3$, which as above shown in Fig. III, is double, and adapted to cut away the two ends of the revolving piece of wood, so as to leave it of only a sufficient length to form the bobbin; the teeth of the double revolving cutter $t^3$, going as near as they can toward the mandrel on which the bobbin is fixed, but so as to avoid touching the same.

Note: And if it is intended to form a beveled or chamfered edge to each of the ends of the bobbin, a circular cutter of suitable bevel on its edge, and of a suitably less diameter than each of the cutters $t^3$, may be applied flatwise against each of them, at that side thereof which is adjacent to the other cutter. And then in turn the wood is brought into contact with the fixed tool $G^2$, which is double, being two knife edges adapted for paring smooth the two ends, which have been previously rough cut by the circular cutter $t^3$. Or note: In lieu of the fixed tool $G^2$, a pair of revolving circular knives (see Fig. VIII,) may be applied as shown by the dotted circles in Fig. I, for paring smooth the two ends of the bobbin. And lastly, the wood is brought in contact with the cutting edges of a stationary tool $G^3$, which smooths the outside or largest part of the ends of the bobbin where it was first rough cut by the rotatory cutter $t^1$.

Each block or rough piece of wood, passes in succession through all the above stages of its formation, by which it is reduced from the rough state to the intended form and size of a bobbin; which being done, then as it proceeds farther around in the circular orbit, that end of it which is nearest to the rings $c$, $c$, is brought into gradual contact with an inclined plane $b$, which is fixed to the rings B, B, and operates obliquely on the wood close to the mandrel until it becomes loosened therefrom, and the inclined plane may be adapted to remove the bobbin wholly from the mandrel, so as to deposit it in a trough or gutter, down which it may descend into a basket, and other rough pieces of wood may then be stuck on the several mandrels in order to be turned into bobbins, in like manner as their predecessors.

If it is proper, the extreme end of each mandrel $p$, may be formed into a boring bit suitably for perforating the rough pieces of wood, which being presented by the hand to the bit, when the same is revolving rapidly, the wood will be perforated through, and will become stuck in place on the mandrel, at one manipulation. And note: There is a stop $c$, fixed to the rings B, B, to regulate how far the wood shall be pushed along the mandrel to suit it for being operated upon by the several cutters in manner aforesaid. And note: It is only by way of example, that the making of bobbins has been described, the machinery not being confined to the turning of those articles, but may be adapted by application of suitable tools, and suitable adjustments of the cutting edges of those tools, for turning other articles. And note: The several spindles $e$ $e$, may have like mandrels and pieces of wood applied on their opposite ends, with a suitable set of revolving and stationary cutters, suitably disposed at the other side of the rings $c$, $c$, (as is represented by dotted lines in Fig. II,) for carrying on the operation above described at both ends of the machinery at the same time; the articles which are in process of turning at one of those sides may be of a different size or shape from those which are turning at the other side according to the adjustment of the respective cutting tools.

Note: The broad strap $i$, does not of itself, oblige the spindles to turn around when they are at the upper part of their circular orbit.

Note: The belt $i$ must be of suitable strength and breadth, to cause the pulleys $h$ and spindles $e$, to turn around without being easily stopped. And if necessary, an endless cord or cords, or a catgut band or bands, may be carried about suitable grooves at the end of the several pulleys $h$, in a suitable manner for transmitting motion from one to another, so as to keep them all in continual motion, and prevent one or more from being stopped, without stopping all the others; and then the force wherewith the belt $i$, operates to turn all those pulleys $h$, with which it is in contact, will become operative to keep each one going, whenever it may have any additional resistance to overcome. And note: The two circles or movable rings C, C, may be both firmly affixed to a horizontal axis, by means of radiating arms, with which each ring may be provided, in the manner of two wheels fixed on one axis, so as to revolve therewith, and the two ends of that axis being sustained in bearings, at the tops of suitable standards, erected on the table A, A, it will be unnecessary to support the moving rings C, C, by the fixed rings B, B, but the latter (if used at all,) may be large enough in their interior apertures to leave the movable rings C, C, detached within them without touching. The model is constructed upon this principle, and the drawings show the principle previously described.

When the articles which are to be turned, project out so far from the ends of the spindles $e$, $e$, as to render an additional support requisite for the outermost, or most remote end of each article, then another ring D (whereof a front and side view are shown in Fig. XI,) may be attached to the revolving rings C, C, Fig. I, by means of the studs E, E, Fig. XI, so that the ring D, will go around with the rings $c$, $c$, and in the ring D, there is a sliding center V, to stand exactly opposite to the end of each of the spindles $e$, $e$, so as to answer the purpose of what is called the back center in a turner's lathe, for turning between centers.

The ends of the several spindles $e$, $e$, may have suitable chucks fixed to each one, for receiving and sustaining one end of the mandrel, wherein the article which is to be turned is mounted, (or for sustaining one end of the article itself, if no such mandrel is required,) and the other end of the mandrel, (or of the article itself,) being sustained by the end of the sliding center V, in the manner shown at Fig. XII, the article will be securely sustained at each end, where it revolves, in the same manner as it would be in a turner's lathe, when mounted therein between centers.

Each sliding center V, is made fast by means of a pinching screw W, Fig. XI.

Note: If the machine is intended to be used with the ring D, and sliding centers V, then the carriages S, S, S, for sustaining the spindles of the rotatory cutters, (if such cutters are required to be used,) must be placed with their bases so much farther off from the rings C, C, as will leave room for the ends of the sliding centers V, V, to go around without interference with the bases of the carriages S, S. Nevertheless the upper parts of the carriages S, S, may be made to overhang their bases, toward the rings C, C, as much as is requisite for holding the rotatory cutters in the position shown in Figs. II, and III.

Description of the improved machinery for turning, which is represented in Plan II. It operates by carrying along with a slow progressive motion, in a straight line, a set of cutting tools, (some of which may be rotatory) so as to bring the cutting edges thereof, into gradual contact with, one after another, of several articles which are to be turned, those articles being kept in rapid motion, each one around its own central line or axis of rotation.

The machinery in Plan II, although different in its construction from the machinery in Plan I, already described, produces the same results, by a slow progressive motion in a straight line, as the machinery in Plan I, produces by a slow progressive motion in a circular orbit.

Fig. I, is a side elevation. Fig. II, a horizontal plan. Fig. III, an end elevation, and Fig. IV, a cross section.

The same letters of reference, denote the same parts in all the figures.

A, A, is a fixed bed plate or frame, whereon the different parts of the machine are supported.

B, B, is a fixed frame erected at one side of the bed plate A, A, opposite to the middle part of its length and affixed thereto. The frame B, sustains the bearings for a series of spindles $a, a,$ similar to those of a turner's lathe, they are disposed horizontally, side by side, in a horizontal row, (see Figs. I and II,) each spindle having its pulley $b,$ to give it motion; and these is also a sliding bar $d,$ $d,$ fitted into the frame B, over each spindle, for sustaining the outermost end of each of the articles which are to be turned.

D, is an endless belt or band, which causes all the spindles to revolve together, by passing alternately under the pulleys $b, b,$ of the several spindles, and over intermediate guide pulleys $c, c,$, so that the endless belt D, encompasses half around each pulley $b,$ and gives motion thereto. The belt D, may be tightened at pleasure by means of the pulley E.

$f$ is a broad pulley fixed on one of spindles $a,$ for giving motion thereto, by means of a belt C, which passes over a large pulley wheel F, on a main driving shaft R, disposed over the machine; the motion thus given to one spindle is communicated to all the others by the belt D.

$d, d,$ are horizontal sliding bars, supported one over each spindle $a,$ in suitable sockets in the framing B, so as to draw in or out endwise, and they are capable of being fixed fast by means of pinching screws $e, e.$ Each of these sliding bars turns down at the end, to carry a center screw $g,$ which points horizontally toward the end of the spindle $a,$ for the purpose of supporting the outermost extremity of the article, which is to be turned, the other or innermost end being supported and turned around by the end of the spindle $a, a,$ in the same manner as if the article was mounted in a turning lathe between centers $p.$ Figs. I, II and IV, represent how the rough blocks are sustained by their ends in the machine in manner aforesaid, for the purpose of being turned. But note: When more convenient, the articles to be turned may be affixed to the ends of the general spindles $a, a,$ by any of the modes used for turning like articles in a common lathe, without using the center screws $g, g,$ which together with the sliding bars $d, d,$ may in that case be removed out of the way.

The two uppermost projecting edges of the fixed bed plate A, A, are made straight and true, one edge with an angle upward, the other flat in the manner of the bed of a slide lathe, to receive the sliding frame or carriage H, so that it can slide along all the length of the bed plate A, A, with a horizontal straight line motion.

H, is a carriage which sustains a set of revolving and fixed cutting tools, which are very similar to those used in the machinery plan I, and like them, are capable of every requisite adjustment of their position on the carriage H, for adapting them for the work to be performed by each one. The carriages H, with the cutting tools is moved along upon the edges of the bed plate A, with a slow progressive motion, by means of a small pinion M. Fig. IV, whereof the teeth work into those of a long horizontal rack L, which is fixed within the hollow part of the bed plate A, the said pinion M, deriving its support from the carriage H, and its motion from the following wheel work.

A pulley $k$, on a short horizontal axis $l$, across one end of the bed plate A, is turned by a belt from a suitable pulley on the shaft R, of the main pulley wheel F, and a miter wheel $m$, is attached to the pulley $k$, so that both together can run loose upon the cross axis $l$, which serves them as a center pin.

The miter wheel $m$, turns such another miter wheel P, which is fixed on the extreme end of a long horizontal axis $n$, $n$, whereon another pair of miter wheels $o$, $o$, are fitted so as to run loose thereon, and they are capable of sliding along the axis $n$, $n$, which has a groove extending all its length, as seen in Fig. II.

$r$, is a double catch box, fitted on the axis $n$, in the space between the two miter wheels $o$, $o$, with a feather entering into the groove of that axis, so as to compel the catch box $r$, to go around with the axis $n$, $n$, although it can slide freely along that axis. When the catch box $r$, is engaged with either one of the miter wheels $o$ or $o'$, it connects that one to the axis $n$, and causes it to go around therewith, but leaves the other miter wheel O, loose on the axis $n$. The two miter wheels $o$, $o$, both work into a third miter wheel $u$, fixed on the upper end of an inclined axis T, Fig. IV, which is sustained in bearings fixed to the carriage H, and at the lower end of the same axis, is the aforesaid small pinion M, whereof the teeth work in those of the fixed long rack L. And according as one or other of the miter wheels $o$, or $o'$, is connected by the catch box $r$, with the long axis $n$, so the third miter $u$, with its axis T, and pinion M, will be turned around one way or the contrary way, and will give a slow progressive motion to the carriage H, in one direction, or the other, along the edges of its bed plate A, A. Or if the catch box $r$, is placed in the midway between the two miter wheels $o$, $o$, it will not connect with either of them, and then the carriage H, will remain motionless.

K, K, are two small brackets fixed to the carriage H, and projecting up laterally therefrom, with bearings to fit the axis $n$, $n$, so as to sustain it from bending, and those bearings also include the two miter wheels $o$, $o$, between them, in order to oblige both those wheels to partake of the motion of the carriage H, and slide endwise along the spindle $n$.

$p$, is a short lever mounted on a horizontal stud center pin, which is forced into the carriage H, and projects out therefrom, the upper end of the lever $p$, is forked to embrace the middle part of the catch box $r$, so as to command its position between the two mitered wheels $o$ $o$. When the carriage H, H, has been moved by the pinion M, and rack L, with the slow progressive motion, all the lengths of the bed plate A. show the tail or lower end of the lever $p$, coming in contact with the fixed stud $s$, or $s$, causes the lever $p$, to disengage the catch box $v$, from that one of the miter wheels $o$, or $o'$, with which it was previously engaged, so as to discontinue the further motion of the carriage in that direction, and then by applying the hand to move the tail of the lever $p$, still farther, the catch box $v$, may be engaged with the other of those miter wheels $o$, in order that the same may turn around the third bevel wheel $u$, with its inclined spindle, T, and pinion M, in a reverse direction, suitably for beginning to move the carriage H, in an opposite direction to that in which it has previously progressed, and by these means, the carriage H, is caused to move alternately backward and forward along the edges of its bed plate A, A, with a slow progressive motion, from one end of that bed plate to the other.

$q$, is a small pulley driven in the same manner as the pulley $k$, by an endless belt from a suitable pulley on the shaft R, of the first motion wheel F, the pulley $q$, runs loose upon the cross axis $l$, but there is a catch box $v$, fitted on the cross axis $l$, with a feather, so as to go around therewith, and the catch box $v$, is capable of being slid along the axis $l$, in order to engage the pulley $q$, with that axis, and turn the same around.

$x$ is a lever arm which is forced to the upper end of an axis J, (see Fig. III,) the end of the lever $x$, being forked to embrace and command the catch box, $v$, at the lower end of the upright axis J, another lever arm $z$ is fixed at right angles to the lever arm $x$, and a connecting rod $y$, $y$, extends horizontally from the end of that lever arm $z$, along the hollow of the bed plate A, A, toward the other end thereof.

When the carriage H, is at the extent of its course, as in Figs. I and II, a suitable prominence of the carriage H, comes in contact with a stop fixed on the rod $y$, and thereby moves the lever $z$, so as to engage the catch bar $v$, with the pulley $q$, in order to give a rapid motion to the axis $l$; but note that motion has no effect on the pulley $k$, and its miter wheel $m$, because as before mentioned they are fitted loose on the axis $l$.

A large driving pulley Z, which is fixed on the extreme end of the cross axis $l$, communicates motion by a long endless band to the several rotary cutting tools U, V. W, by means of a small pulley which is fixed on the end of the spindle of each such tool. The endless band N, extends from the driving pulley Z, all the length of the machine, and returns around another leading pulley X, at the opposite end thereof. In that course, the band N, passes half around the pulley $w$, which is fixed upon the spindle of one of the rotary cutting tools V, then the band N, returns to make a half turn around of a similar pulley on the axis of the rotary tool U, and goes forward therefrom to make a half turn around the corresponding pulley on the axis of a third rotary tool W, whence it returns to make a final half turn around a duplicate pulley, fixed on the same axis as the first mentioned pulley $w$, and proceeds forward therefrom to the leading pulley X.

Fig. V, is a horizontal plan of the carriage or sliding frame H; Fig. VI, an end elevation; Fig. VII, a side elevation, and Fig. VIII, a longitudinal section of the same.

The spindles of the several rotatory cutting tools U, V, W, are mounted in bearings, at the upper ends of suitable spindle carriages G, G, G, which are disposed crosswise on the sliding carriage H, and by means of horizontal setting screws E, in the base of each spindle carriage G, G, G, the same can be moved horizontally endwise in the direction of the length of the spindle, suitably for adjusting the positions of the revolving cutting tools to their intended work. The spindle carriages G, can be also turned a little about on the carriage H, as may be desirable for adjustment; and the bearings for the spindles are fitting into upright grooves in the spindle carriages G, with upright screws $y$, for elevating and depressing the bearing in those grooves, as shown in Figs. VI and VIII. The cutting tools can be thereby adjusted to any height, suitable for cutting and reducing the articles to be turned (and which articles are mounted at the ends of the spindles $a$, $a$,) as much as each tool is required to do, when it is carried beneath all those articles in succession, by the slow progressive motion of the sliding carriage H, along the edges of bed plate A, A.

The rotatory cutters U, V, W, may be of any of the kinds hereinbefore mentioned and described, respecting the machinery plan I, but they are fixed on the middle parts of the respective spindles instead of on the extreme ends thereof.

$t$, are cutting tools affixed to the carriage H, they are supported on the top of an upright cylindrical stem, which is fitted into a socket I, and fastened therein with a pinching screw, so as to be capable of adjustment to any height or direction which the cutting edges may require, and the socket I, is fixed to the sliding carriage H by a screw passing through an oblong hole in the foot of the socket, and through another like hole in the flat surface of the carriage H; there are several such holes as shown in Fig. V, to admit of placing the fixed tools $t$, (or several such tools,) in any required position, to qualify their cutting edges for acting properly on the articles to be turned. These tools may be of the nature of cutters, or of gouges or of chisels, or plane irons, either single or double, or knife edges for paring as already explained respecting the machinery plan I, according to the work that is required to be performed by each of such tools.

The rough unshapen articles which are to be turned by this machinery, are to be mounted at the ends of the several revolving spindles $a$, $a$, so as to be turned rapidly around therewith, and their other ends may be supported (if necessary) by the points of the center screws $g$, $g$.

The sliding carriage H, containing the rotating and other cutting tools, suitably adjusted to their proper positions thereon, for performing their respective parts of the turning operation, is moved with a slow progressive motion from the position in which it is represented in the drawing, along the edges of the bed plate A, toward the other extremity of that plate. The several rotatory cutting tools U, V, W, are at the same time turned rapidly around by means of the band N, N, from the driving pulley $z$, passing around the pulley $w$, and also around the other pulleys on the spindles of the rotatory tools. The several spindles $a$, $a$, to which the articles to be turned are fixed, are at the same time turned rapidly around by means of the endless belt from the main pulley wheel F, so that the several articles will revolve about their own central lines, in the same direction as the cutting tools revolve. As the sliding carriage passes onward, the first rotatory cutting tool W, is brought within reach of the first revolving article, and it will reduce that article circularly but roughly, to a cylindrical form of the size required, and progressing onward that rotatory cutter will perform the same operation on the second, and then on the third article, and so on in succession of all the rest. The second rotatory tool V, following after the first one, as is obvious from the drawing, operates in its turn upon each of the articles in succession to reduce their middle parts circularly, but roughly in such manner as may be required, and according as the same tool may have been previously adjusted to do. Then the third revolving cutter U follows in due succession, and operates for cutting down the two ends of each article. And then the cutters $t$, follow for smooth cutting, and there may be others if necessary for performing the work required.

After the last or finishing tool $t$, has passed by the last of the articles, and completed the turning thereof, the sliding carriage H, will have run the whole course, and its further motion in that direction is stopped by its lever $p$, coming in contact with one of the studs S, Fig. I. And then by moving the lever *p*, the motion of the sliding carriage is reversed, to move it back again to its original position, as represented in the drawing. The turned articles are then removed, and a fresh set of rough unshapen articles may be introduced in order to be turned as above described.

The spindles *a, a*, may be made suitably for giving motion to another additional set of articles at the opposite end of each spindle to that which has been described, and the sliding bars *d, d*, may have clamps to fit on the opposite ends of them, for carrying suitable center screws to support the outer ends of those additional articles, as shown by the dotted lines in Figs. III, and IV, and a duplicate of the bed plate A, A, may be fixed on the other side of the frame B, B, to receive a duplicate of the sliding carriage H, with its set of cutting tools and appurtenances to operate on the said additional articles, whereby the machinery will become capable of operating on two sets of articles at the same time, in the same manner as already described, respecting plan I.

Note: In all cases, the relative speeds of motion, produced by the revolving motions of the articles to be turned, and of the rotatory cutters, compared with the speed of the slow progressive motion (whether in a circular orbit, or in a straight line,) whereby the cutting edges are to be brought into operation on the revolving articles, must be adapted, one to the other, suitably for the size and kind of articles to be turned, and suitably for the material of which such articles consist.

The requisite adaptation of such speeds is to be attained, by removing such of the several driving pulleys or wheels represented by H, *j, k, y*, and F, Plan I, or by *k, q*, and F, Plan II, in the drawings, as may be too large or too small for producing the requisite speeds, and replacing them by others of suitable sizes for producing such actual and relative speeds of the several parts, as is well known to persons conversant with the art of turning, to be suitable for operating upon different articles and materials. And respecting those parts of my improved machinery, which may be made applicable to other useful purposes than that of turning, the same are the following parts of the machinery Plan I, which have been hereinbefore described, namely, the fixed frame A, and rings B, B, also the revolving rings or wheels *c, c*, with the spindles *e, e*, which are sustained by them, together with the pulleys *h, h*, and broad belt *i*, with the large pulley F, by which all the spindles are turned around. Likewise the ring of teeth *a*, on the rings C, C, and the wheel-work *f*, H, and I, (with the aid of the additional wheelwork *j, k*, and *o*, if requisite,) whereby the rings C, C, are turned so as to carry all the spindles around in their circular orbit, with a slow progressive motion.

The carriages S, S, for the several rotatory cutters being removed, and the said improved machinery will then be applicable for the purposes of boring, or perforating round holes in articles which require to be bored or perforated, by a succession of boring tools, operating one after another; those boring tools being affixed in their due order of succession, to the ends of the spindles *e, e*, so as to project out in continuation of the spindles, and so as to be turned rapidly around therewith.

The article to be bored, may be held in the hands and presented to the cutting end of one such boring tool, and being pressed toward the same, will be bored or perforated thereby, and then after being withdrawn therefrom, will be ready to be presented in like manner to another succeeding boring tool, which may be of larger size, and which by the slow progressive motion of all the spindles in their circular orbit, will have been brought around into a suitable position for presenting the article to it, in order to rebore, or deepen or enlarge the hole already bored, or begun to be bored by the preceding tool; and in like manner, a third boring tool and a fourth, or as many thereof, as may be required, and all which may be adapted to follow one after another, in due succession. And such application of the improved machinery Plan I, to the purpose of progressive boring, may be performed at one end of the several spindles, and one side of the rings C, C, while the operation of turning is carried on in manner herein before explained, at the other end of the same spindles, and the other side of those rings; in which case, the several carriages S, S, for the rotatory cutting tools which are represented in Figs. I and II, need not be removed, but only those which are represented by dotted lines in Fig. II, are to be removed or omitted, as appears in Fig. III.

The said improved machinery, either Plan I or Plan II, may be also made applicable to the purpose of filing or grinding articles to a circular form, or of grinding and then polishing such articles, by substituting circular files or grindstones, or circular grinding laps, or wheels, in place of the revolving cutters herein before described, such circular files or grindstones, or circular grinding laps or wheels, may be fixed on the same spindles as those herein before described for the rotatory cutters; and by operation of the aforesaid slow progressive motion, (whether in a circular orbit or in a straight line,) each of the revolving articles, and the moving circumferences of the revolving circular files or grindstones, or circular grinding laps or wheels, will be brought gradually into contact one with the other, so as to file or grind, or to grind and polish the said articles by such contact, and then, by further onward continuance of the same slow progressive motion, the said articles and moving circumferences, will be caused to quit such contact, and separate one from the other; and then by further onward continuance of the same slow progressive motion, the said articles and the moving circumferences of other revolving circular files or grindstones, or circular grinding laps or wheels, may be brought into contact in turn, all in the same manner, as herein before described respecting rotatory cutters, but supposing revolving circular files or grindstones, or circular grinding laps or wheels, to be substituted as aforesaid, for those rotatory cutters.

Having now described the improved machinery for turning, I the said JOHN CLARK, the younger, do hereby declare that the new invention, consists in the new combinations of machinery hereinbefore described, and which may be constructed, as represented in plan I, wherein any suitable number of the article or articles which are to be turned, are disposed with their several center lines or axes of rotation, side by side, parallel one to another in a circular orbit; and at the same time that each article is turned rapidly around about its own axis of rotation, the whole are moved with a slow progressive motion around in their circular orbit; each article moving therein with its axis of rotation parallel to itself. In order by that motion, to bring each revolving article in its turn, (or one after another,) in contact with (and then to pass by or away from,) the cutting edges of a succession of cutting tools, whereof some are stationary, and others are rotatory; and some of which cutting tools are adapted to cut away and reduce, (or to form by turning,) some parts of the revolving article or articles, when the same are caused by the said slow progressive motion, combined with their rapidly revolving motion, to come in contact with and to pass by the said cutting edges, whereof such as belong to the rotatory cutters, are themselves in rapid motion; and others of the said cutting tools, are adapted in like manner to cut away and reduce, (or to form by turning) other parts of the said articles, and the said cutting tools being so applied, as to be adapted for operating in that manner, one after another for rough turning the parts on which they are severally intended to operate, and then in due succession for smooth turning the same parts; the said cutting tool or tools, being also capable of all requisite adjustments of its, or their several position or positions, in respect to the revolving article or articles, (when by the aforesaid slow progressive motion it is, (or they are) caused to come in contact with, and then pass by or away from, the cutting edge or edges of those tool or tools,) so as by such adjustments, together with suitable adaptations of the cutting edge, or of the several cutting edges to qualify the latter (for the time being,) for cutting away and reducing, (or for forming by turning) the revolving article or articles (or a continual succession of such,) so that particular form and size to which they are all intended to be turned or formed by turning. Or the machinery may be constructed in the manner represented in plan II, wherein any suitable number of the article or articles which are to be turned, are disposed side by side, parallel to each other in a straight row, and at the same time that they are all turned rapidly around about their own several central lines, or axes of rotation, a cutting tool or series of cutting tools, (which may be or whereof some may be rotatory,) is or are moved along with a slow progressive motion in a straight line, in a direction across the said several axes of rotation, but parallel to the row in which all those axes are disposed.

In order by such slow progressive motion, to bring the cutting edge or the several cutting edges of the said tool or tools in succession, in contact with and then to pass by, or away from one of the revolving articles after another, so as by the revolving motion of the article or articles, combined with the slow progressive motion of the cutting tool or tools, and also with the revolving motion of such of those tools as are rotatory, to cut away and reduce (or to form by turning) all the articles to that particular form and size, to which they are intended to be turned (or formed by turning,) some of the said cutting tools being adapted to operate in that manner, upon some parts of the revolving article or articles, and others of these tools to operate in like manner on other parts thereof; and the said cutting tools, being so applied as to be adapted for operating in that manner one after another for rough turning the parts on which they are severally intended to operate and then in due succession for smooth turning the same parts.

The said cutting tool or tools, being also capable of all requisite adjustments of its position, or of their several positions in respect to the revolving article or articles, when by the slow progressive motion of the cutting tool or tools, the cutting edge or edges thereof come in contact with and then pass by or away from the article or articles, so as by such adjustments, together with suitable adaptations of the several cutting edges to qualify the latter, (during the time being,) for cutting away and reducing, (or forming by turning,) all the revolving articles to their intended form and size.

Note: I make no claim to the revolving cutters or files on grindstones, or grinding wheels by themselves, but only when they are used in the new combination of machinery hereinbefore described.

In testimony whereof, I, the said JOHN CLARK, Junior, subscribe my name in the presence of the witnesses whose names are hereto subscribed, on the seventeenth day of May in the year of our Lord eighteen hundred and thirty-nine.

JOHN CLARK, JR.

Signed in our presence:
ROBT. L. WOOD,
JAS. STERLINGE.